US012643087B2

(12) United States Patent
Velasquez et al.

(10) Patent No.: US 12,643,087 B2
(45) Date of Patent: Jun. 2, 2026

(54) PHASE CHANGE ADSORBENTS FOR CHEMICAL STORAGE AND SEPARATION APPLICATIONS

(71) Applicant: THE REGENTS OF THE UNIVERSITY OF CALIFORNIA, Oakland, CA (US)

(72) Inventors: Ever O. Velasquez, Berkeley, CA (US); Mercedes K. Taylor, Berkeley, CA (US); Colin A. Gould, Berkeley, CA (US); Jeffrey R. Long, Lafayette, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 398 days.

(21) Appl. No.: 18/358,466

(22) Filed: Jul. 25, 2023

(65) Prior Publication Data

US 2024/0024848 A1      Jan. 25, 2024

Related U.S. Application Data

(60) Provisional application No. 63/391,833, filed on Jul. 25, 2022.

(51) Int. Cl.
| | |
|---|---|
| *B01D 53/02* | (2006.01) |
| *B01J 20/22* | (2006.01) |
| *C07F 3/06* | (2006.01) |

(52) U.S. Cl.
CPC ............ *B01J 20/226* (2013.01); *B01D 53/02* (2013.01); *C07F 3/06* (2013.01); *B01D 2253/204* (2013.01); *B01D 2257/102* (2013.01)

(58) Field of Classification Search
CPC ........ B01D 2253/204; B01D 2257/102; B01D 53/02; B01J 20/226; C07F 3/06
See application file for complete search history.

(56) References Cited

U.S. PATENT DOCUMENTS

| | | | |
|---|---|---|---|
| 10,702,850 B2 | 7/2020 | Long | |
| 2014/0061540 A1* | 3/2014 | Long | ................... B01J 20/3425 |
| | | | 423/247 |

(Continued)

FOREIGN PATENT DOCUMENTS

WO          2017062733 A1      4/2017

OTHER PUBLICATIONS

Service, Robert F., Science, vol. 346, Issue 6209, Oct. 31, 2014, pp. 538-541.

(Continued)

*Primary Examiner* — Christopher P Jones

(74) *Attorney, Agent, or Firm* — O'BANION & RITCHEY LLP; John P. O'Banion

(57)          ABSTRACT

Metal organic frameworks are provided that exhibit a reversible phase change from a collapsed state to an expanded state. Due to this material property, these adsorbents exhibit stepped isotherms that have relevance in chemical storage and separations. The metal organic framework is M(LDP), where M is a metal selected from the group of Zn, Fe or Co and L is a ligand selected from the group of 1,4-benzenedipyrazolate ($H_2$BDP), 2,5-pyridinedipyrazolate ($H_2$PyDP), 2,5-pyrimidinedipyrazolate ($H_2$PymDP), 2,5-pyrazinedipyrazolate ($H_2$PyzDP), and 3,6-pyridazinedipyrazolate ($H_2$PydDP). The step pressure position in the isotherm was changed by using nitrogen instead of carbon in the ring allowing for tunable aromatic interactions.

19 Claims, 16 Drawing Sheets

Collapsed Zn(BDP)

High P

Low P

Expanded Zn(BDP)

(56) References Cited

U.S. PATENT DOCUMENTS

| | | | | |
|---|---|---|---|---|
| 2015/0307419 A1* | 10/2015 | Long | .................. | C07B 63/00 |
| | | | | 585/738 |
| 2018/0297010 A1* | 10/2018 | Long | .................. | C01B 3/0015 |
| 2024/0024848 A1* | 1/2024 | Velasquez | .......... | B01D 53/02 |

OTHER PUBLICATIONS

Annual Energy Outlook 2015, Energy Information Agency (2015).
Wegrzyn, James E., et al., "Adsorbent storage of natural gas", Applied Energy, vol. 55, Issue 2, Oct. 1996, pp. 71-83.
Makal, T. A.; Li, J.-R.; Lu, W.; Zhou, H.-C. Chem. Soc. Rev. 41, 7761-7779 (2012).
Center for Climate and Energy Solutions. Hydrogen Fuel Cell Vehicles, at http://www.c2es.org/technology/factsheet/HydrogenFuelCellVehicles.
Horike, S.; Shimomura, S.; Kitagawa, S. Nature Chem. 1, 695-704 (2009).
Zhao, X.; Xiao, B.; Fletcher, A. J.; Thomas, K. M.; Bradshaw, D.; Rosseinsky, M. J. Science 306, 1012 (2004).
Mason, J. ; Oktawiec, J.; Taylor, M.; Hudson, M.; Rodriguez, J.; Bachman, J.; Gonzalez, M.; Cervellino, A.; Guagliardi, A.; Brown, C.; Llewellyn, P.; Masciocchi, N.; Long, J. Nature 527, 357 (2015).
Choi, H. J.; Dinca, M.; Dailly, A.; Long, J. R. Energy Environ. Sci. 3, 117 (2010).
Taylor, M. K.; Runcevski, T.; Oktawiec, J.; Gonzalez, M. I.; Siegelman, R. L.; Mason, J. A.; Ye, J.; Brown, C. M.; Long, J. R. J. Am. Chem. Soc. 138, 15019 (2016).
A) Pinner, A. Chem. Ber. 26, 2126 (1893). (b) Audebert, P.; Sadki, S.; Miomandre, F.; Clavier, G.; Verni eres, M. C.; Saoud, M.; Hapiot, P. New J. Chem. 28, 387 (2004).
Taylor, Mercedes K., et al., "Near-Perfect Co2/CH4 Selectivity Achieved through Reversible Guest Templating in the Flexible Metal-Organic Framework Co(bdp)", J. Am. Chem. Soc. 2018, 140, 32, pp. 10324-10331.

* cited by examiner

Expanded Zn(BDP)

Collapsed Zn(BDP)

High *P*

Low *P*

FIG. 3

PHASE CHANGE ADSORBENTS FOR CHEMICAL STORAGE AND SEPARATION APPLICATIONS

CROSS-REFERENCE TO RELATED APPLICATIONS

This application claims priority to, and the benefit of, U.S. provisional patent application Ser. No. 63/391,833 filed on Jul. 25, 2022, incorporated herein by reference in its entirety.

STATEMENT REGARDING FEDERALLY SPONSORED RESEARCH OR DEVELOPMENT

This invention was made with Government support under Contract Number DE-AC02-05CH11231, awarded by the U.S. Department of Energy. The Government has certain rights in the invention.

NOTICE OF MATERIAL SUBJECT TO COPYRIGHT PROTECTION

BACKGROUND

1. Technical Field

The technology of this disclosure pertains generally to metal organic frameworks (MOF) systems and methods, and more particularly to compositions, systems and methods for the production of metal organic frameworks that exhibit a reversible phase change from a collapsed state to an expanded state. Due to this material property, these adsorbents exhibit stepped isotherms that have relevance in chemical storage and separations.

2. Background

Sustainable processes necessitate the development of new materials for energy-efficient chemical storage and separations. A main application for these materials is the utilization of natural gas (mainly composed of methane) which will be critical to the reduction of $CO_2$ emissions. The consumption of natural gas is expected to grow substantially due to domestic abundance of natural gas resources. These economic and environmental factors have sparked interest in the transportation sectors as an alternative fuel compared to petroleum. However, the use of natural gas in vehicular applications is severely limited by the low volumetric energy density at ambient temperature and pressure. While volumetric energy density can be increased by compression or liquefaction, this results in complicated and expensive storage systems where natural gas is typically stored at 250 bar nominal working pressure. These systems require 3.5 times greater storage volume compared to a liter of gasoline to yield the same energy quantity. These drawbacks necessitate the development of adsorption-based systems where high surface area materials store large amounts of $CH_4$ in ambient conditions. Adsorbed natural gas (ANG) systems could reduce the cost of on-board tanks, the cost and technical difficulty of high-pressure compressors at stations, and the barriers to building a fuel delivery infrastructure.

A promising class of materials for gas storage are metal-organic frameworks (MOFs), which are high surface area materials composed of inorganic clusters and organic linkers. Unlike traditional porous materials, MOFs can be readily tuned through the selection of metal ions and organic linkers to control pore geometries and surface functionalities. Additionally, MOFs can also demonstrate structural flexibility based on external stimuli such as gas pressure. These flexible frameworks can collapse under reduced pressure into a non-porous structure where minimal gas is adsorbed, but after a critical threshold pressure is reached can then exhibit an abrupt rise or "step" in adsorption caused by a phase change to the expanded porous structure. An adsorbent with an 'S-shaped' or 'stepped' $CH_4$ adsorption isotherm can lead to enhanced selectivity, high usable storage capacities, and reduced thermal management requirements.

BRIEF SUMMARY

A new series of metal-organic frameworks with heterocyclic interactions is provided that is based off of the zinc variant of the M(BDP) framework family. These materials have a unique adsorption mechanism in which the adsorbents undergo a phase change from a collapsed to expanded phase based on external stimuli such as gas pressure. The frameworks Co(BDP) and Fe(BDP) ($BDP^{2-}$=1,4-benzene-dipyrazolate), also display remarkable $CH_4$ adsorption capacities through a 'stepped' shaped isotherm compared to the conventional Langmuir-type adsorption.

However, the metal variants, Co(BDP) and Fe(BDP), are highly air-sensitive, which impedes their use in industrial scale-up. Therefore, Zn(BDP) was first prepared due to its chemical stability in air and aqueous conditions as well as zinc being a readily available, low-cost metal which would be essential for industrial utilization of MOF adsorbents.

One issue with Zn(BDP) is that it has not been shown to have stepped-shaped adsorption similar to Co(BDP) and Fe(BDP). The benefits of stepped-shaped behavior are an increase in usable capacity and intrinsic heat management during adsorption and desorption. To provide this capability, the framework structure was modified by ligand and MOF synthesis changes. The adsorption properties framework has been tuned to make the technology generalizable to applications that might require higher storage pressures. This was accomplished by increasing the flexibility of Zn(BDP) with the incorporation of nitrogen groups into the aromatic rings, as well as the demonstration of tuning the step pressure by systematically changing the nitrogen positions. The heteroatomic variants of the $H_2BDP$ ligand were synthesized with the central ring containing pyridine, pyrimidine, pyrazine, pyridazine, and tetrazine. The air-stability and tunable step shaped adsorption were then confirmed, showing that this technology has high potential for use in chemical storage and separation applications.

While these materials are suitable for methane storage, the tuning of the step pressure is important in their implementation to other industrial applications. The $CH_4$ storage in biogas facilities will occur at pressures lower than 18 bar, but for heavy-duty vehicles, the step pressure can be greater than 100 bar, for example.

The adsorbent step pressures have been characterized mainly with methane (the main component in natural gas), where the step pressure was tuned from approximately 1 bar to over 100 bar at ambient temperatures based on the aromatic interactions. The step pressure of the frameworks has been tuned by the utilization of nitrogen instead of carbon in the ring allowing for tunable aromatic interactions. The step pressures of these frameworks are highly adsorbate dependent and can also be used for chemical separations, which we have shown for hydrocarbon purification. These frameworks also exhibit increased air/humidity stability and cyclability, due to the Zn—N coordination bonds in the framework, compared to similar metal variants of these materials.

Current technologies utilize rigid frameworks which show Langmuir adsorption rather than a tunable stepped shaped adsorption as provided by the new MOF material. The benefits of the tunable framework are higher selectivities, higher usable capacities, and intrinsic heat management. The phase change adsorbents provide multiple benefits compared to rigid frameworks. This technology shows some of the highest structure flexibility and tunability of the step pressure relative to other materials.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 3 is a diagram of six heterocyclic ligand derivatives of $H_2$(BDP).

DETAILED DESCRIPTION

Referring more specifically to the drawings, for illustrative purposes, MOF compositions, systems and methods of fabrication and use are generally shown. Several embodiments of the technology are described generally in FIG. 1 to FIG. 27 to illustrate the characteristics and functionality of the compositions, systems, materials and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

A class of tunable metal organic frameworks is provided based on the M(BDP) family where ($BDP^{2-}$=1,4-benzene-dipyrazolate) that exhibit a reversible phase change from a collapsed state to an expanded state and exhibit 'stepped' shaped isotherms compared to the conventional Langmuir-type adsorption. Generally, the step pressure can be tuned by systematically changing the nitrogen positions into the aromatic rings of the framework allowing for tunable aromatic interactions. The heteroatomic variants of the $H_2BDP$ ligand can be synthesized with the central ring containing pyridine, pyrimidine, pyrazine, pyridazine, and tetrazine, for example. The benefits of stepped-shaped isotherm behavior and control include an increase in usable capacity and intrinsic heat management during adsorption and desorption. These frameworks show high step pressures that make them relevant for high pressure storage of methane in practical industrial conditions with high cyclability and chemical stability.

The class of frameworks is illustrated with the Zn(BDP) variant which has been shown to have high chemical stability in air and even in acidic and basic conditions. Although the tunable M(BDP) frameworks are illustrated with zinc, frameworks with other metals can be used.

Figure 1:
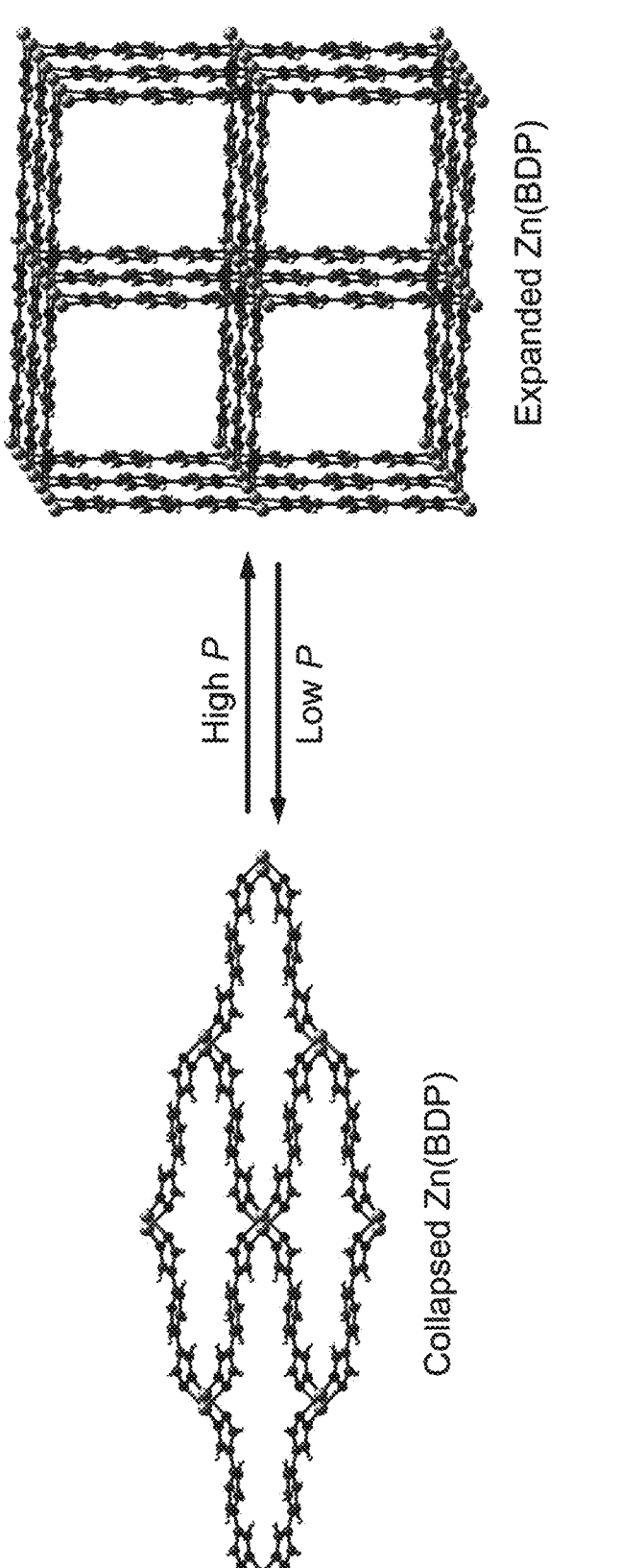
FIG. 1 is a schematic diagram of powder X-ray diffraction structures of the collapsed Zn(BDP) phase (0 bar, Low P) and the expanded Zn(BDP) phase (82 $CH_4$ bar, High P).
Figure 2:
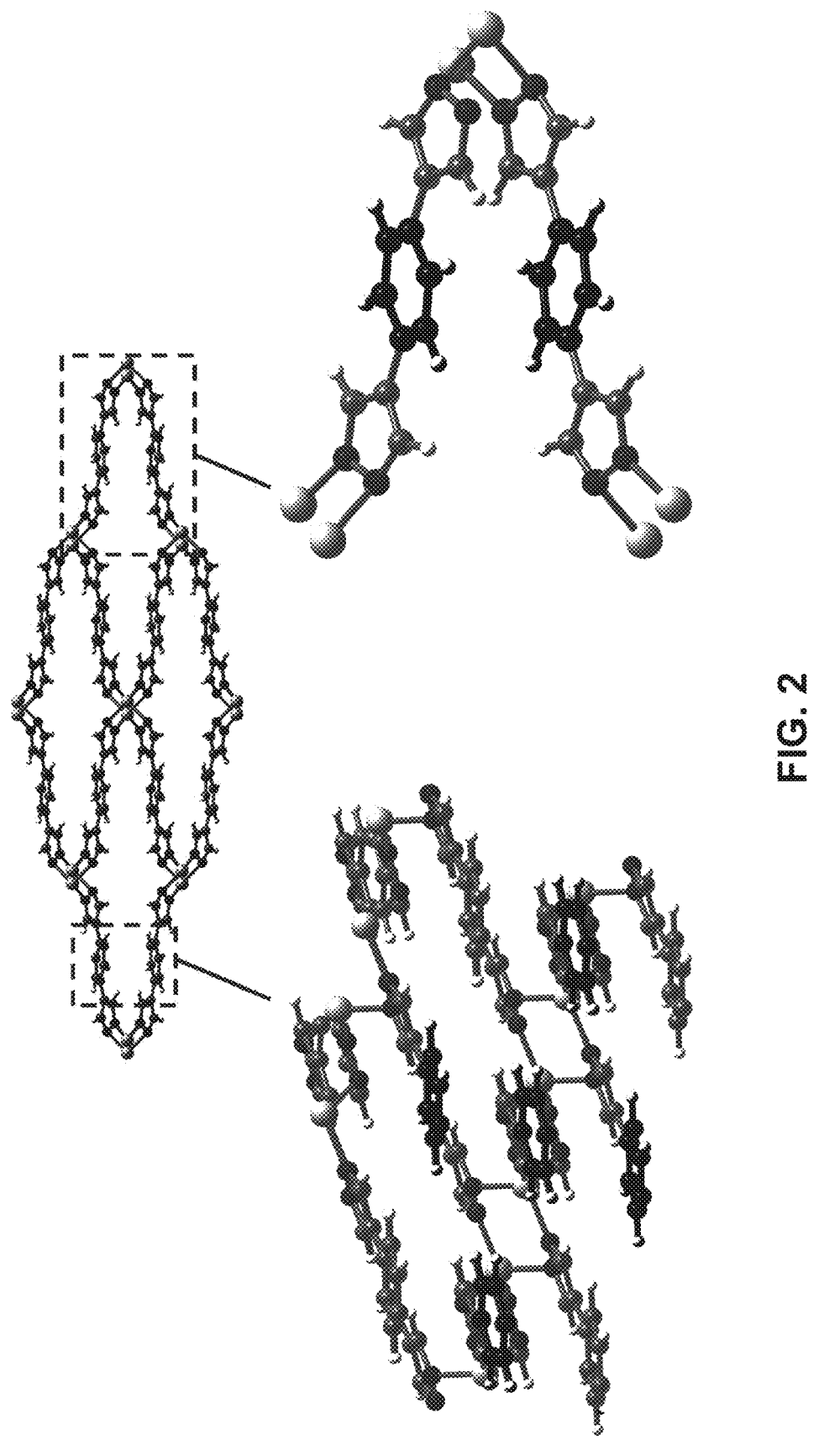
FIG. 2 is a schematic diagram of powder X-ray diffraction structures of the collapsed Zn(BDP) phase highlighting the π-π interactions of the central rings in the framework.

Turning now to FIG. 1, a schematic diagram of powder X-ray diffraction structures of the collapsed Zn(BDP) phase (0 bar, Low P) and the expanded Zn(BDP) phase (82 $CH_4$ bar, High P) shows the transition upon controlled changes in pressure. FIG. 2 is a schematic diagram of powder X-ray diffraction structures of the collapsed Zn(BDP) phase highlighting the π-π interactions of the central rings in the framework. Generally, there is no adsorption taking place in the closed phase and adsorption takes place during the open or partially open phase.

Figure 3:
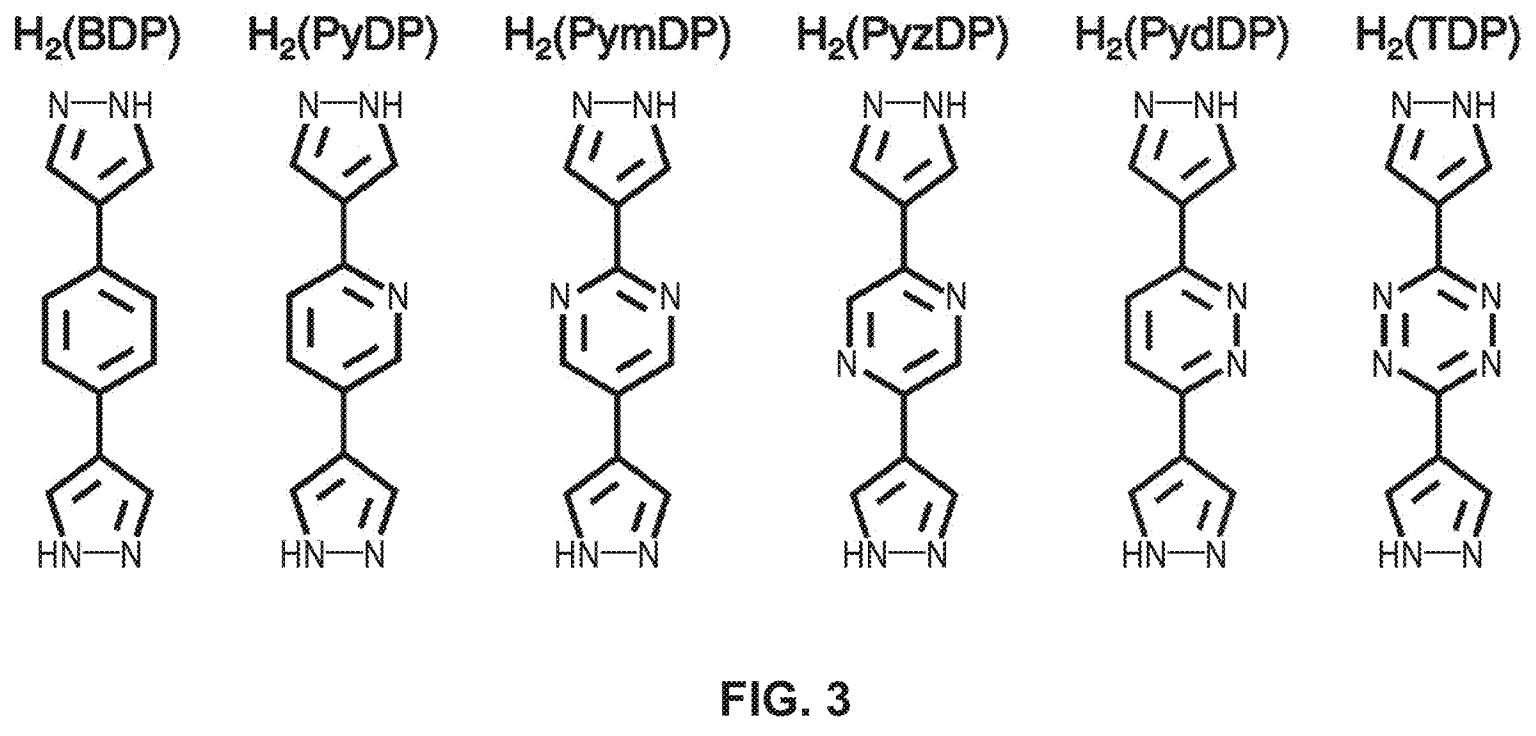

Through these X-ray diffraction studies of the collapsed phase of this framework, it was determined that the main aromatic stacking has parallel-displaced versus edge-to-face π-π interactions between the aryl rings of the neighboring $BDP^{2-}$ ligands as illustrated in FIG. 1 and FIG. 2. These interactions are the primary thermodynamic driving force in stabilizing the collapsed phase of the framework. This led to the creation of a series of new ligands that are shown in FIG. 3 with different heteroaromatics to increase the π-π interactions and therefore the adsorption properties.

These materials were then characterized with X-ray diffraction, high pressure adsorption isotherms, and density functional theory (DFT) to determine that the series of heterocyclic rings can increase these interactions to engender tuneability to the frameworks. Through X-ray diffraction studies, the collapsed phase of Zn(BDP) was revealed to have a parallel-displaced stacking configuration of the benzene rings compared to Co(BDP) which has edge-to-face stacking or the fluorinated variants of Co(BDP) which have a face-to-face configuration. These small differences in the structure can mostly explain the differences in the adsorption behavior of these MOFs.

Figure 4:
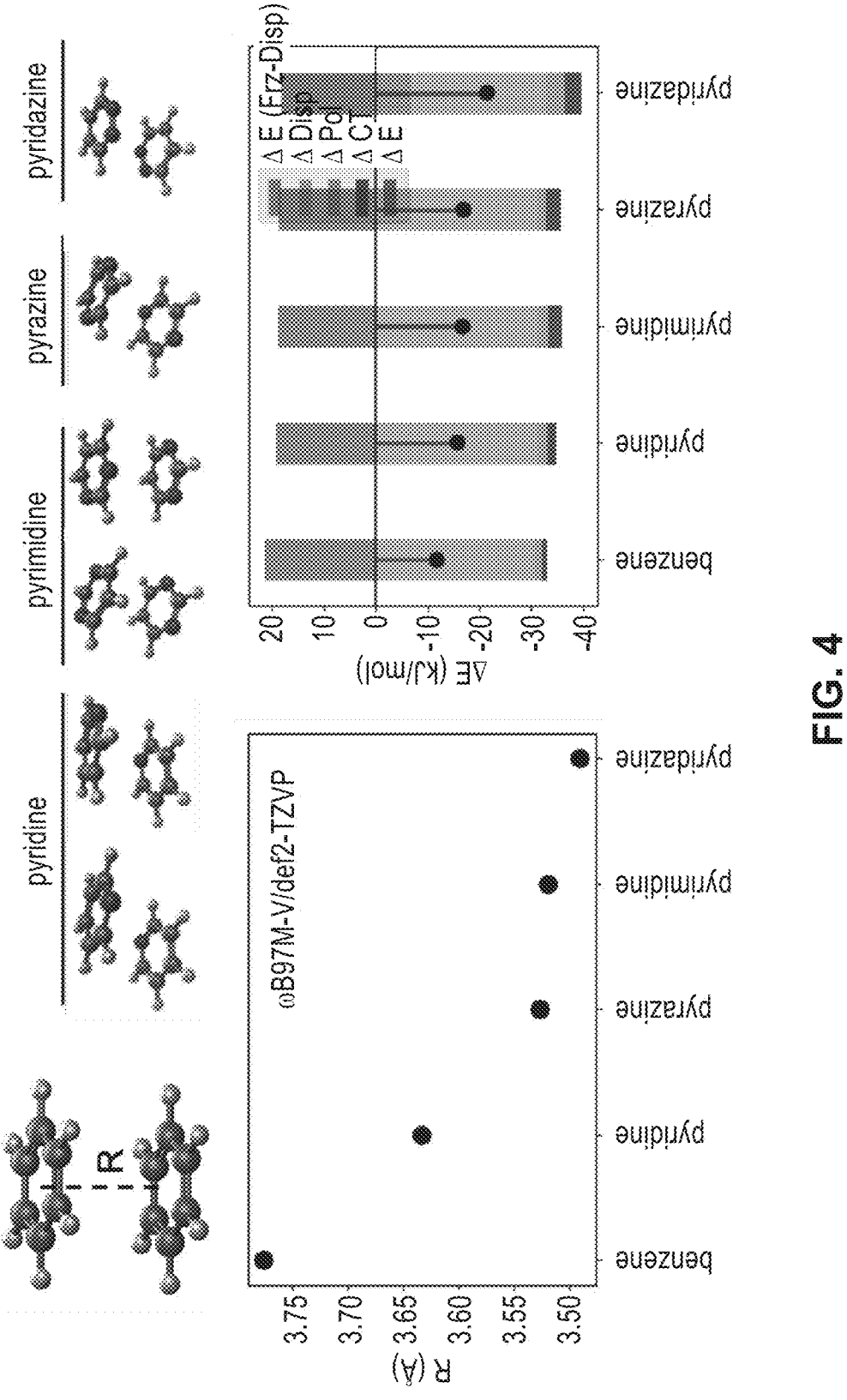
FIG. 4 is a plot of DFT calculations of dimer model stacking for benzene, pyridine, pyrimidine, pyrazine, and pyridazine. The center of mass distance R was calculated for each stacking configuration and the average was taken based on the different configurations of possible stacking. Energy decomposition analysis was also completed showing that dispersion forces are the key contributor in the π-stacking interactions.
Figures 5, 6:
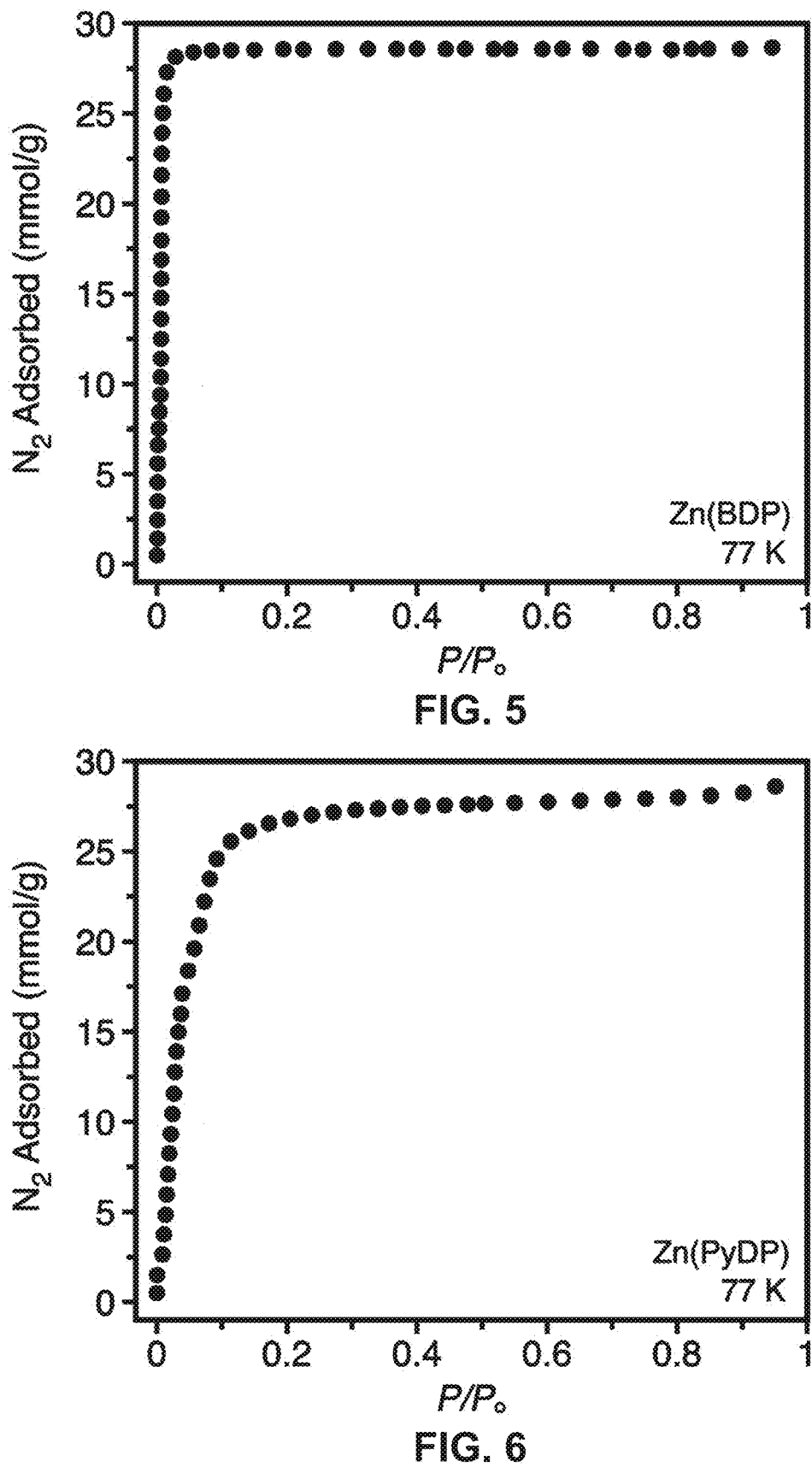
FIG. 5 is a plot of low pressure $N_2$ adsorption isotherm at 77 K for Zn(BDP).
FIG. 6 is a plot of low pressure $N_2$ adsorption isotherm at 77 K for Zn(PyDP).
Figures 7, 8:
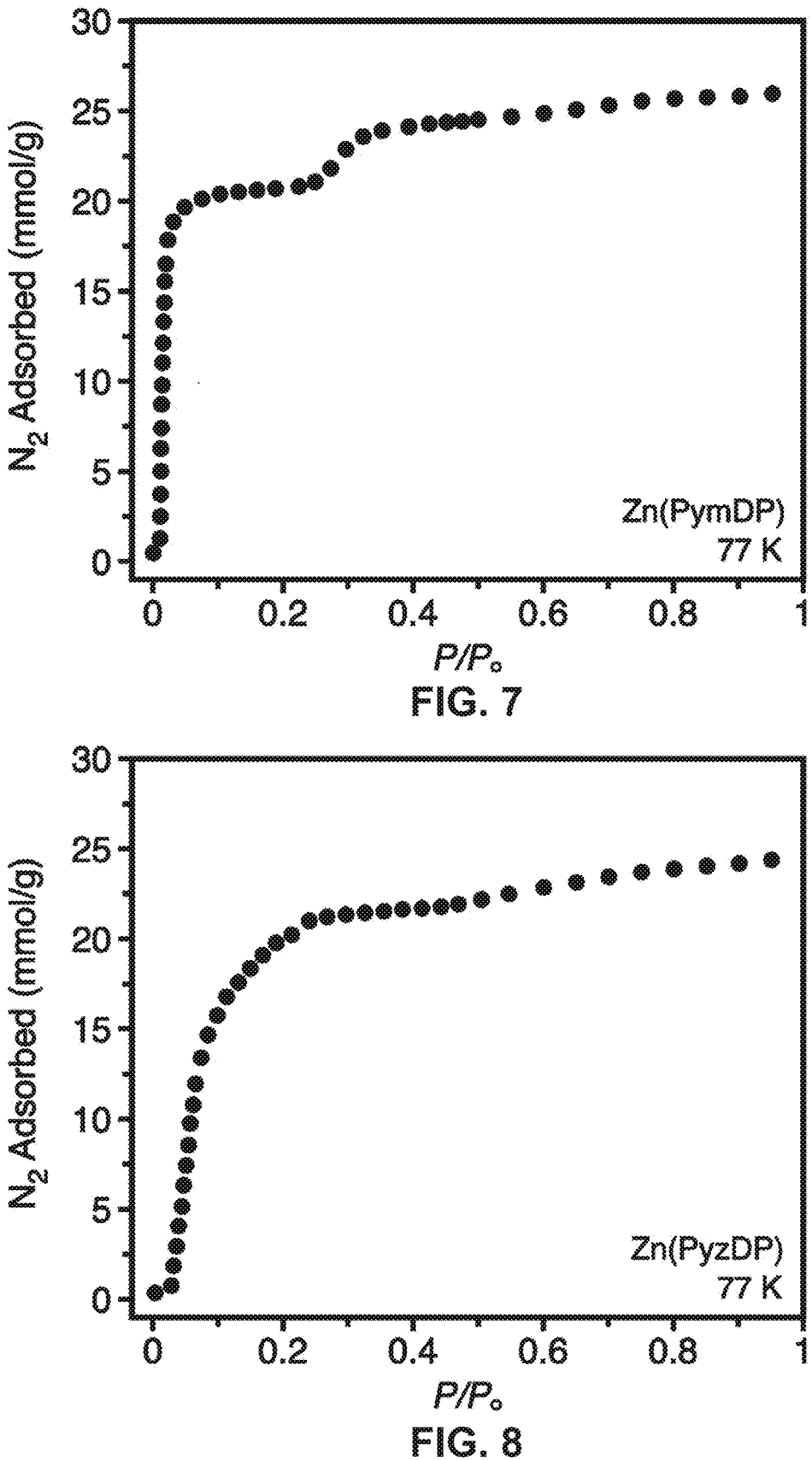
FIG. 7 is a plot of low pressure $N_2$ adsorption isotherm at 77 K for Zn(PymDP).
FIG. 8 is a plot of low pressure $N_2$ adsorption isotherm at 77 K for Zn(PyzDP).
Figures 9, 10:
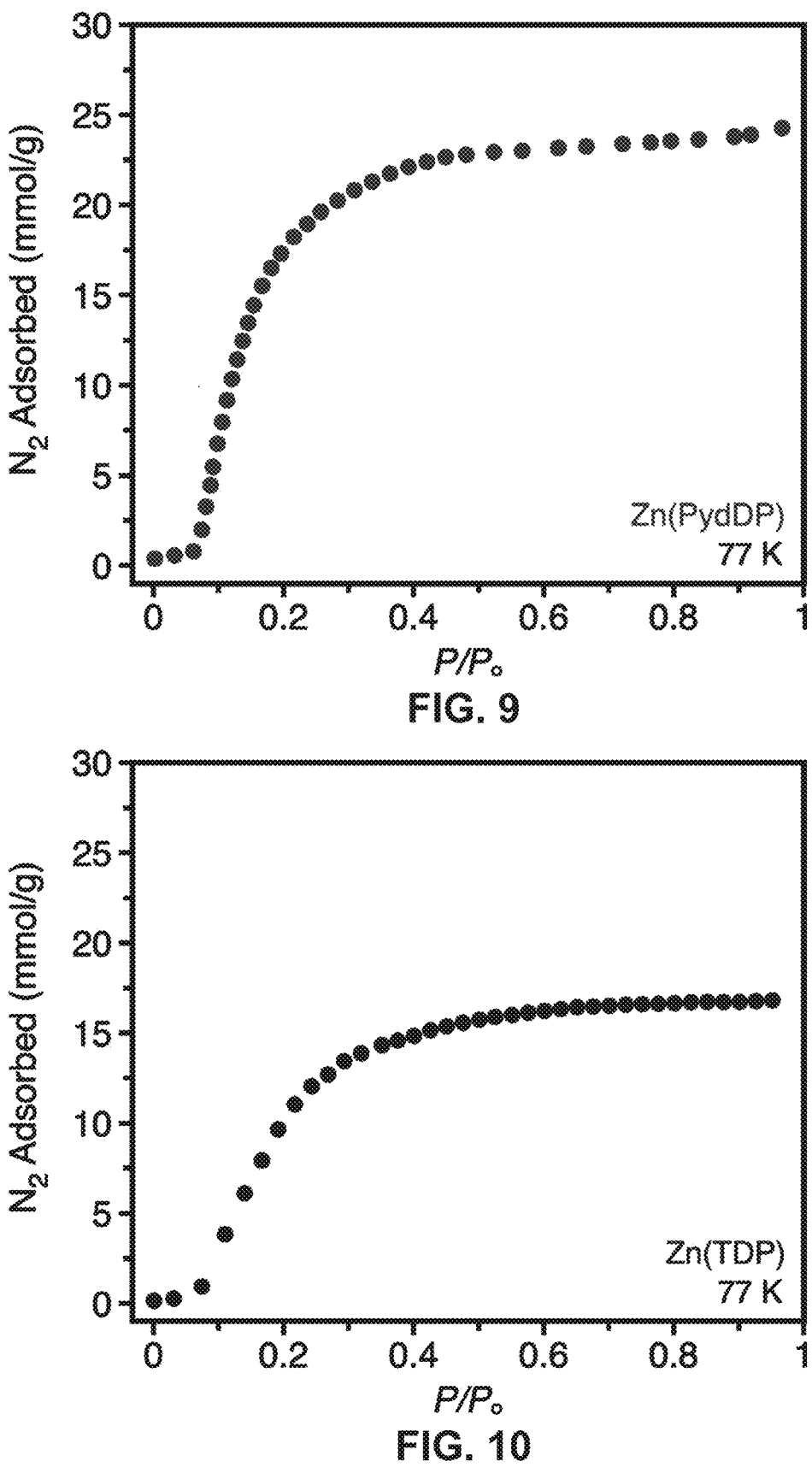
FIG. 9 is a plot of low pressure $N_2$ adsorption isotherm at 77 K for Zn(PydDP).
FIG. 10 is a plot of low pressure $N_2$ adsorption isotherm at 77 K for Zn(TDP).

To increase the flexibility of Zn(BDP), the framework incorporates nitrogen groups into the aromatic rings, that provides tunability of the step pressure by systematically changing the nitrogen positions. The heteroatomic variants of the $H_2BDP$ ligand were synthesized with the central ring containing pyridine, pyrimidine, pyrazine, pyridazine, and tetrazine. Density Functional Theory (DFT) was used with simple dimer model stacking to confirm that stronger interactions can be achieved relative to benzene stacking. The energy decomposition analysis (EDA) showed that the interactions should increase from benzene<pyridine<pyrimidine<pyrazine<pyridazine as shown in FIG. 4. This analysis supported the hypothesis that these heterocyclic variants of $H_2BDP$ can be used to tune the step position of Zn(BDP) and increase usable capacity while maintaining the chemical stability due to the Zn—N coordination bonds.

It can be seen that the step pressure can be tuned by modifying the central ring in the PDP molecule to include one or more nitrogen molecules in the ring, control over the atom positions in the ring as well as by phase pi stacking. Heterocyclic linkers can also be aligned in "staggard", or "parallel" alignments based on the position of the N atoms in the ring.

It can also be seen that the frameworks can also be adapted and tuned for particular applications with the use of mixed ligands or metals in the material to tune the step pressure based on where the step pressure is needed. One example would be the synthesis of the $H_2BDP$ and $H_2PyzDP$ frameworks with a metal source to make a compound that contains benzene/pyrazine, benzene/benzene, and pyrazine/pyrazine interactions. This can be done with two or more ligands to create highly specific interactions.

This design strategy for increasing flexibility with heteroatomic interactions can also be applied to other families of frameworks for chemical storage and separations.

The embodiments described herein can be applied to various storage and separation technologies. For example, one application of the frameworks can be in a wide variety of storage applications including; storage of methane or natural gas for light-duty or heavy-duty vehicles for the use in a fuel tank for delivery into an engine; storage of biogas (mixture of methane, carbon dioxide, and other gases) or biomethane from biogas or waste facilities; storage of hydrocarbons such as ethane, ethylene, propane, or propylene for use in industrial applications; storage of xylenes/aromatics for use in reaction processes or storage of $CO_2$ for industrial use or sequestration.

Another storage application of the frameworks and associated processes may be in the storage of oxygen or air for industrial process such as for the manufacturing of steel and welding or oxygen or air for use in diving or breathing gas tanks in aircraft, submarines, or spaceships.

The framework embodiments may also be fabricated for separation applications such as the separation of gaseous hydrocarbon mixtures such as ethane from ethylene, ethylene from acetylene, or ethane from acetylene; the separation of $CO_2$ containing mixtures from nitrogen, methane, or hydrogen or storage or separation of liquid mixtures such as ethanol-water or water harvesting applications.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the structure and functionality of the frameworks, a new series of dipyrazolate ligands were synthesized by coupling dibromoheterocycles with protected pyrazoleboronic esters. Initial attempts to accomplish this coupling with toluene used high reaction temperatures, large amounts of catalyst, and long reactions time which resulted in low yields (<20%) and incomplete conversion. By utilizing a cosolvent system of dioxane/water instead in this reaction, the yields improved to greater than 95% and 2,5-pyridinedipyrazolate ($H_2PyDP$), 2,5-pyrimidinedipyrazolate ($H_2PymDP$), 2,5-pyrazinedipyrazolate ($H_2PyzDP$), and 3,6-pyridazinedipyrazolate ($H_2PydDP$) were able to be synthesized in the gram quantity. The reaction conditions were also able to be performed at lower temperatures (120° C. to 80° C.), using less catalyst (0.2 eq to 0.01 eq), and with faster reaction times (3 days to 18 hours). The palladium catalyst, XPhos G2, is the most expensive reactant in this synthesis and utilizing considerably less amounts can have significant effects in lowering cost of ligand synthesis and MOF scale-up. Dibromotetrazine was not commercially available but utilizing 4-cyanopyrazole, 3,6-tetrazinedipyrazolate ($H_2TDP$) was able to be synthesized through a sulfur-assisted Pinner synthesis.

After ligand synthesis, the compounds Zn(BDP) and heterocyclic derivatives were synthesized by reacting $Zn(CF_3SO_3)_2$ with the respective ligand in a sealed Schlenk vessel with diethylformamide (DEF) at 120° C. for 3 days under an argon atmosphere. The resulting frameworks obtained were white to off-white crystalline powders. These frameworks were kept air-free for chemical stability studies of the adsorption behavior. Post synthetic solvent exchanges were completed with anhydrous dimethylformamide to remove unreacted materials. After several exchanges, the materials were then washed with anhydrous acetonitrile to exchange DMF from the pores for lower activation temperatures.

After MOF synthesis, single-crystal X-ray diffraction structures were obtained with DEF-solvated single crystals of Zn(BDP), Zn(PymDP), Zn(PyzDP), and Zn(PydDP). The as-synthesized materials revealed the expanded form of the frameworks with one-dimensional square channels. The connectivity of these frameworks was isoreticular to Co(BDP) with the vertices containing chains of tetrahedral pyrazolate-bridged Zn(II) metal centers bridged by rows of the respective $BDP^{2-}$ ligand on all four sides. Single-crystal structures of Zn(PyDP) and Zn(TDP) were not able to be determined, but powder X-ray diffraction data was used to confirm the derivatives were isoreticular in their activated form.

Example 2

$N_2$ adsorption was used to confirm flexibility and porosity in the frameworks. Prior to gas adsorption measurements, the materials were activated at 160° C. for 18 hours under dynamic vacuum to remove solvent from the pores. Low-temperature $N_2$ adsorption was then performed to show similar profiles to Co(BDP). Plots of low pressure $N_2$ adsorption isotherms at 77 K for Zn(BDP), Zn(BDP), Zn(PyDP), Zn(PymDP), (PyzDP) and Zn(TDP) are shown in FIG. 5 through FIG. 10 respectively.

Figures 11, 12:
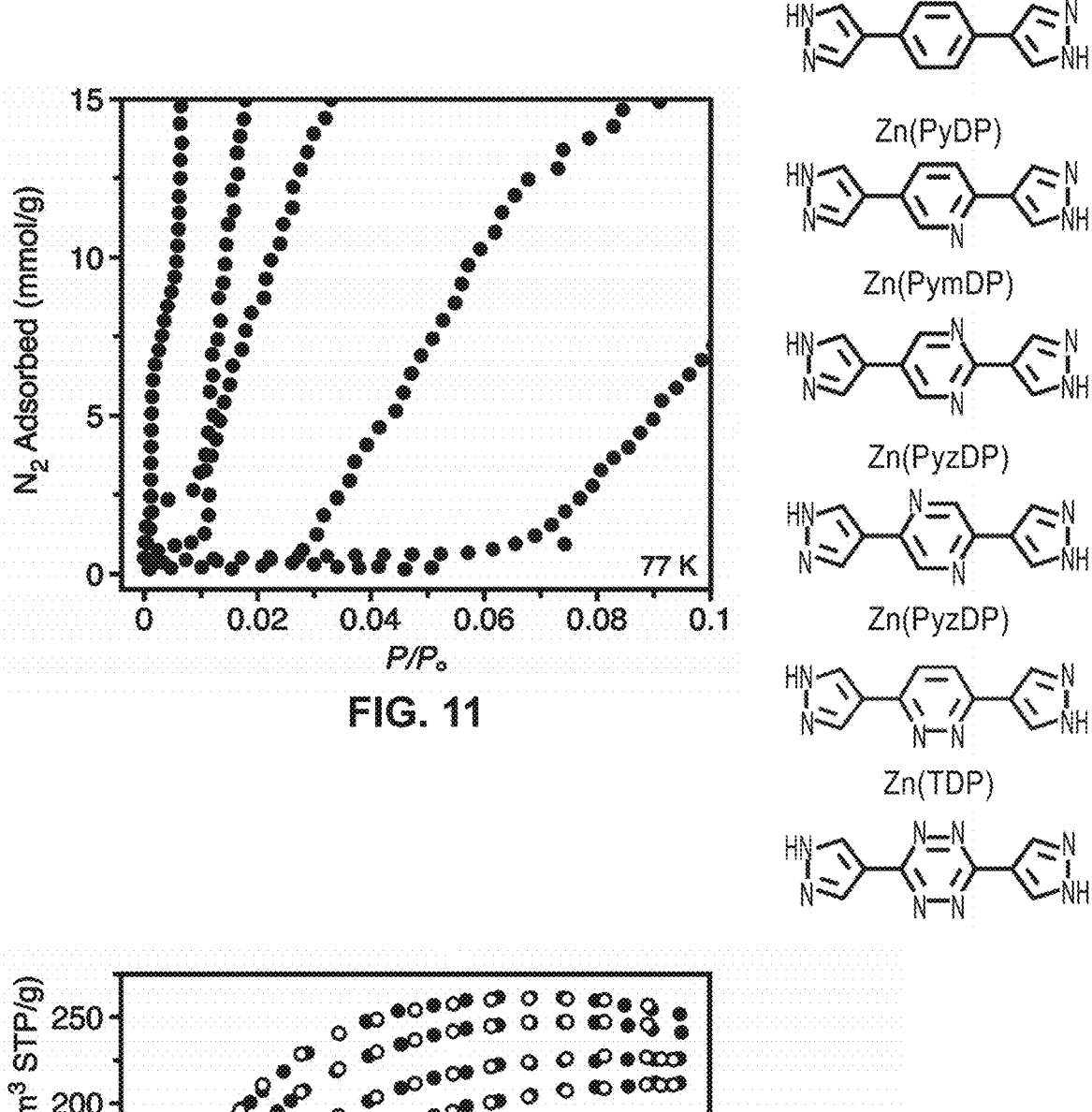
FIG. 11 is a comparison of low pressure $N_2$ adsorption isotherms at 77 K from left to right (0 to 0.1 $P/P_o$) of Zn(BDP), Zn(PyDP), Zn(PymDP), Zn(PyzDP), Zn(PydDP), and Zn(TDP).
FIG. 12 is a plot of high-pressure $CH_4$ adsorption isotherms at variable temperatures (0, 10, 25, and 40° C.) for Zn(BDP) after initial $1^{st}$ run.
Figure 13:
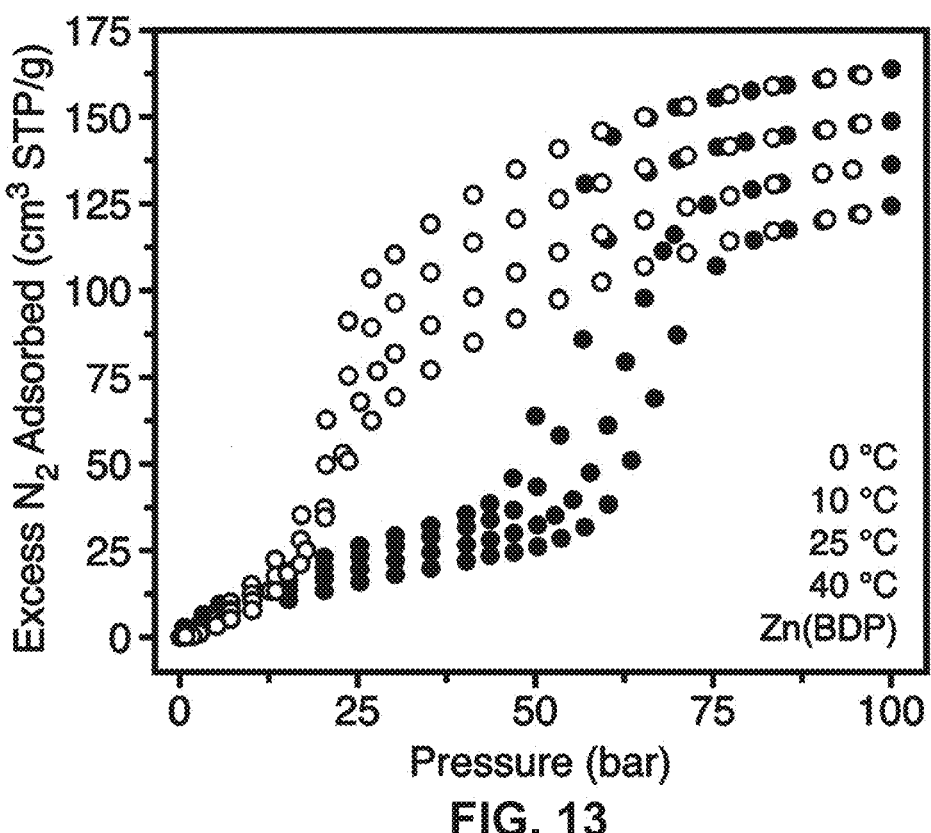
FIG. 13 is a plot of high-pressure $N_2$ adsorption isotherms at variable temperatures (0, 10, 25, and 40° C.) for Zn(BDP).
Figure 14:
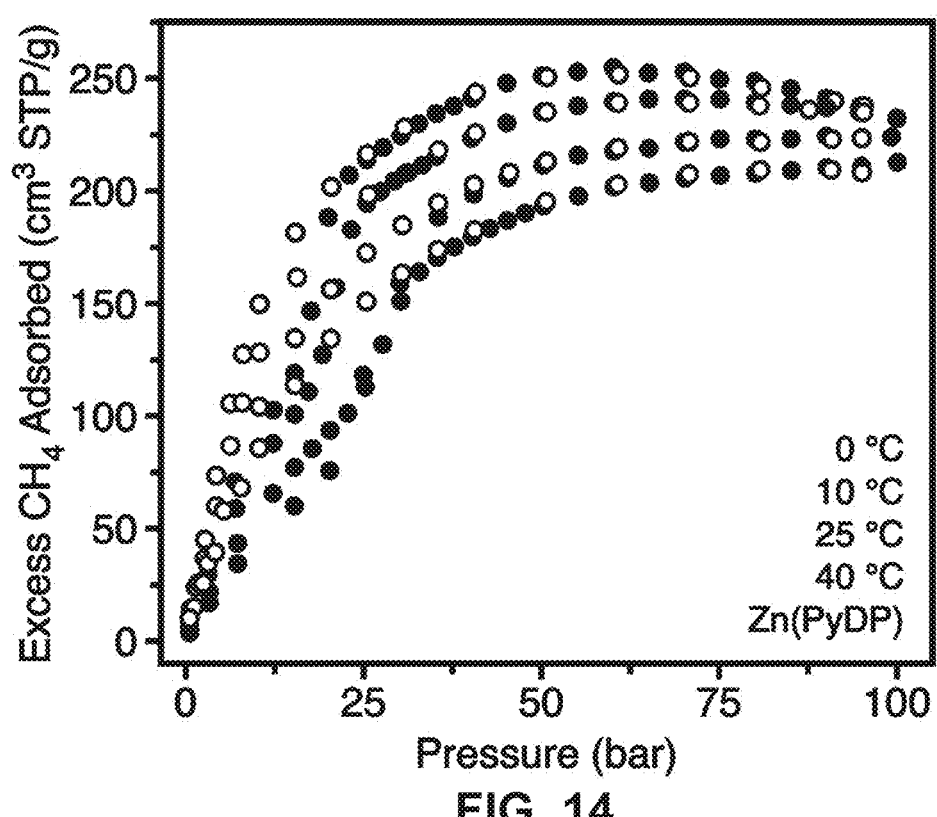
FIG. 14 is a plot of high-pressure $CH_4$ adsorption isotherms at variable temperatures (0, 10, 25, and 40° C.) for Zn(PyDP).
Figure 15:
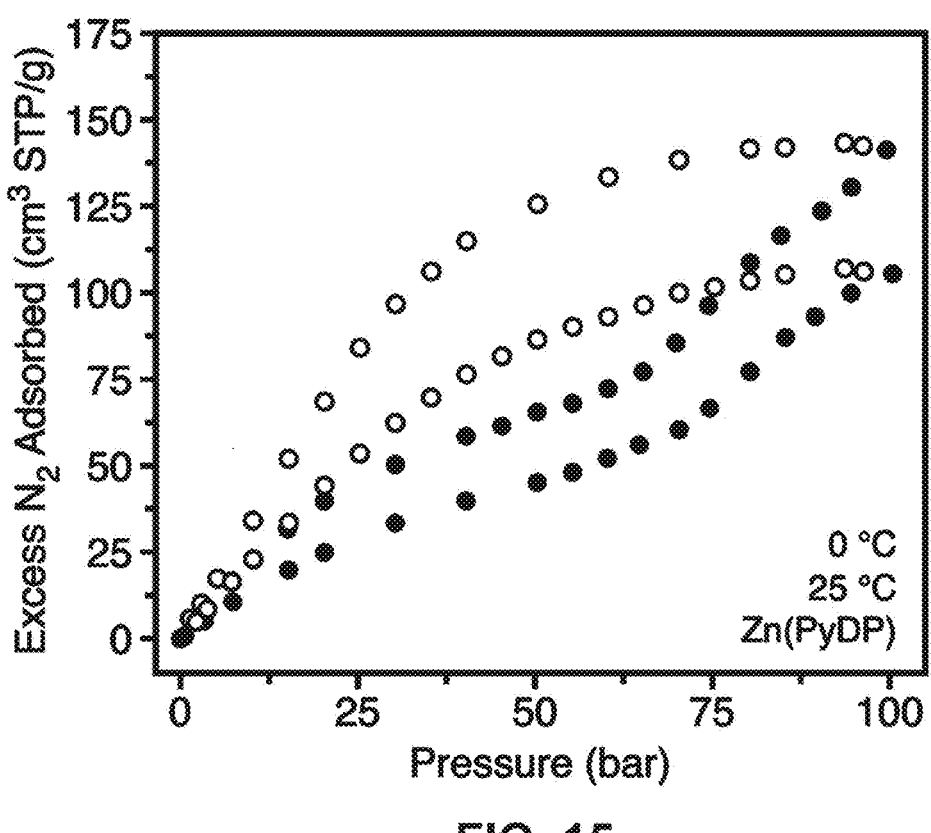
FIG. 15 is a plot of high-pressure $N_2$ adsorption isotherms at 0° C. and at 25° C. temperatures for Zn(PyDP).

These profiles showed that low uptake until phase transitions occurred revealing step-shaped adsorption behavior. Some small differences were noticeable, however, with the zinc frameworks having fewer intermediate phases with broader step shapes. The step pressures for the frameworks were considerably higher with a range from 0.001 to 0.075 $P/P_o$ at 77 K. These higher step pressures indicate that the heterocyclic interactions were stabilizing the collapsed phase revealing a trend of Zn(BDP)<Zn(PyDP)<Zn (PymDP)<Zn(PyzDP)<Zn(PydDP)<Zn(TDP) as shown in FIG. 11.

This comparison was supported by the previous DFT calculations of the dimer models. All the heterocyclic derivatives showed high permanent porosities with Langmuir surface areas between 1800 and 2789 $m^2/g$.

Further improvements in the Zn(TDP) framework synthesis will increase the surface area.

Example 3

To further elucidate the heterocyclic functionality effects on the frameworks, the collapsed phases of Zn(BDP), Zn(PymDP), Zn(PyzDP), and Zn(PydDP) were studied, and synchrotron powder X-ray diffraction data was collected on the activated powders. It was confirmed from this data that all the derivatives adopt a collapsed phase state under activated vacuum conditions. Studying the aromatic interactions of each structure revealed all the derivatives to have a parallel-displaced configuration of the central ligand ring. Due to disorder of the nitrogen atoms versus the carbon atoms in the ring, exact stacking configurations cannot be determined by powder X-ray diffraction. Intuitively, however, it can be assumed that the electronegative nitrogen groups would not stack on each other, and the rings would rotate to have a nitrogen over a carbon due to being a more favorable electrostatic state.

To quantify that the π-π interactions between the central rings was increasing, the center of mass distance, R, was calculated, since it can be used as a guide for the interaction strength between π-stacked configurations. The calculated R values were determined to be 3.84 Å for Zn(BDP), 3.60 Å for Zn(PyDP), 3.44 Å for Zn(PymDP), 3.39 Å for Zn(PyzDP), and 3.12 Å for Zn(PydDP). Thus, it can be concluded that the introduction of nitrogenous heterocycles in the central ring can be used to increase the favorability of the π-π interactions in Zn(BDP).

Example 4

To further demonstrate how these increased interactions can affect the adsorption behavior of Zn(BDP) in practical storage applications, ambient high-pressure adsorption isotherms were measured for methane, which is the main component in natural gas. All measurements were conducted between temperatures of –10° C. to 40° C. and pressures of 1 bar to 200 bar. Adsorption isotherms of $CH_4$ and $N_2$ for Zn(BDP) and Zn(PyDP) showed considerable pre-step, but hysteresis could still be observed confirming flexibility. Plots of high-pressure $CH_4$ adsorption isotherms and $N_2$ adsorption isotherms at variable temperatures for Zn(BDP) and Zn(PyDp) after initial $1^{st}$ run are shown in FIG. 12 through FIG. 15 respectively.

Figure 16:
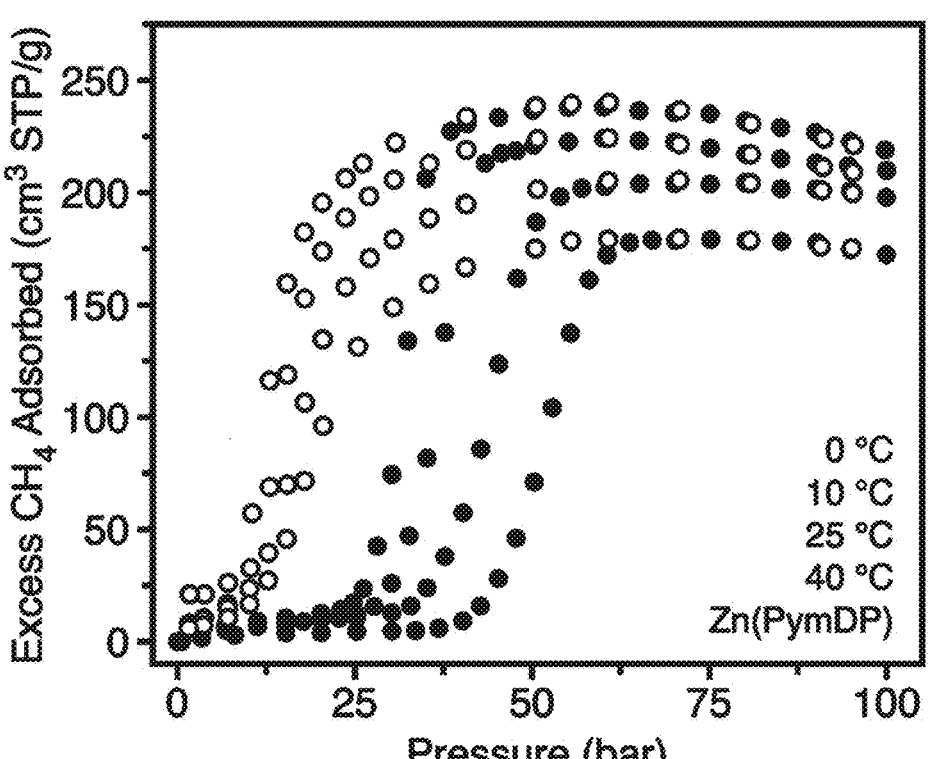
FIG. 16 is a plot of high-pressure $CH_4$ adsorption isotherms at variable temperatures (0, 10, 25, and 40° C.) for Zn(PymDP).
Figure 17:
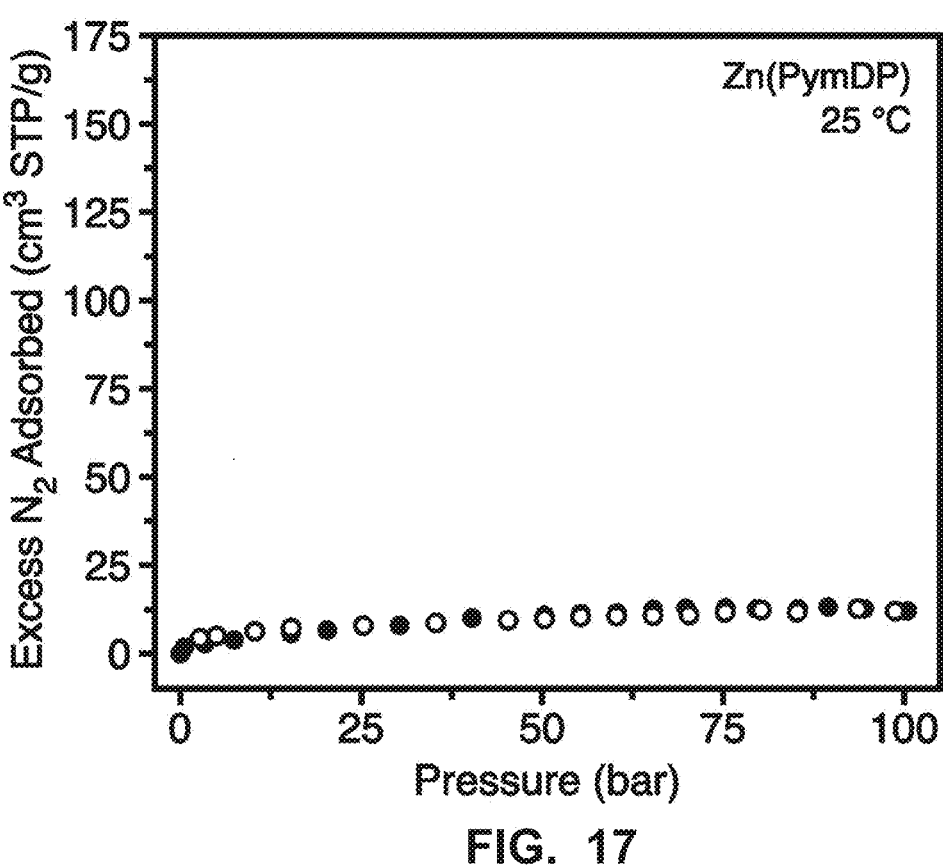
FIG. 17 is a plot of high-pressure $N_2$ adsorption isotherm at 25° C. for Zn(PymDP).
Figure 18:
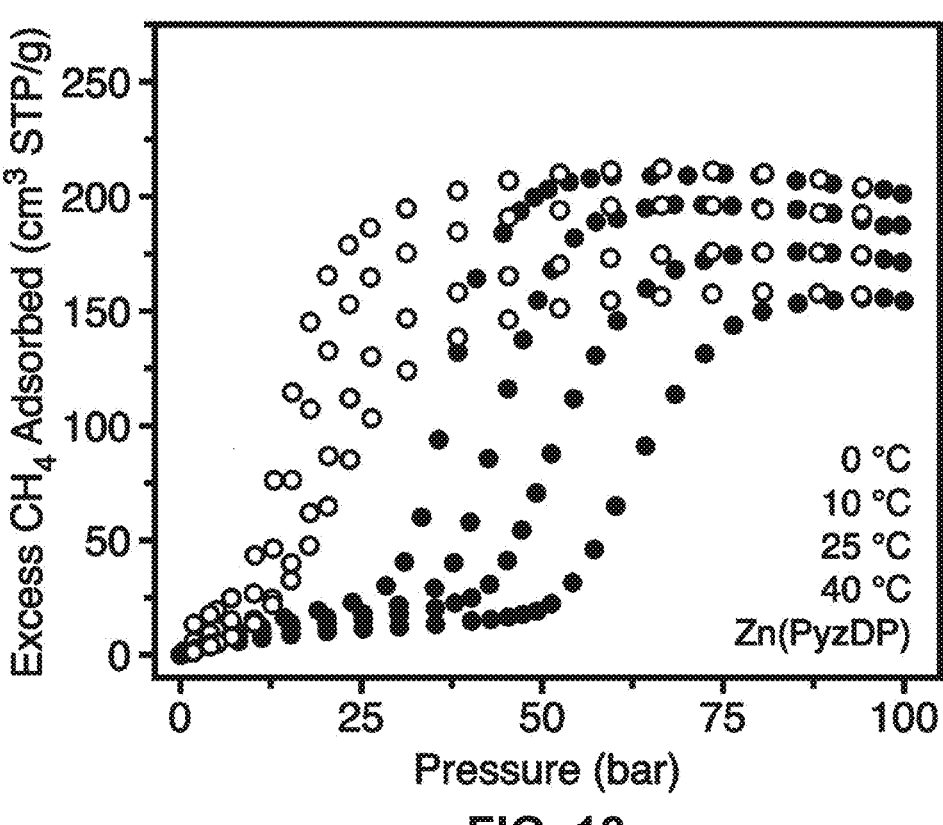
FIG. 18 is a plot of high-pressure $CH_4$ adsorption isotherms at variable temperatures (0, 10, 25, and 40° C.) for Zn(PyzDP).
Figure 19:
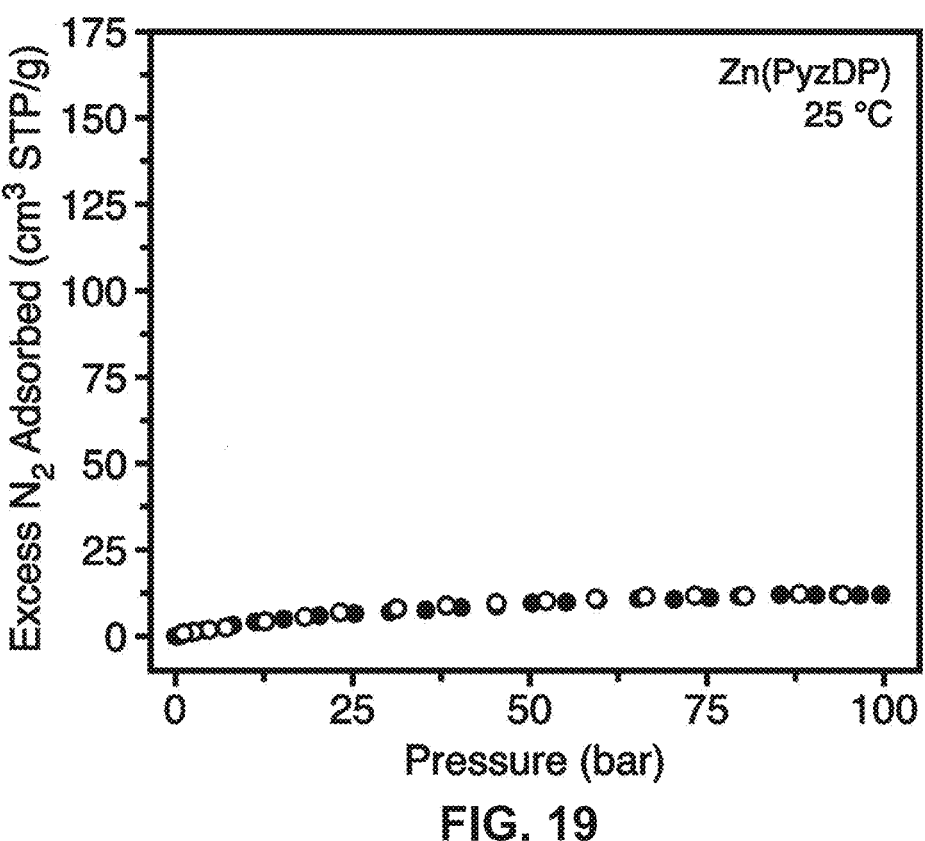
FIG. 19 is a plot of high-pressure $N_2$ adsorption isotherm at 25° C. for Zn(PyzDP).
Figure 20:
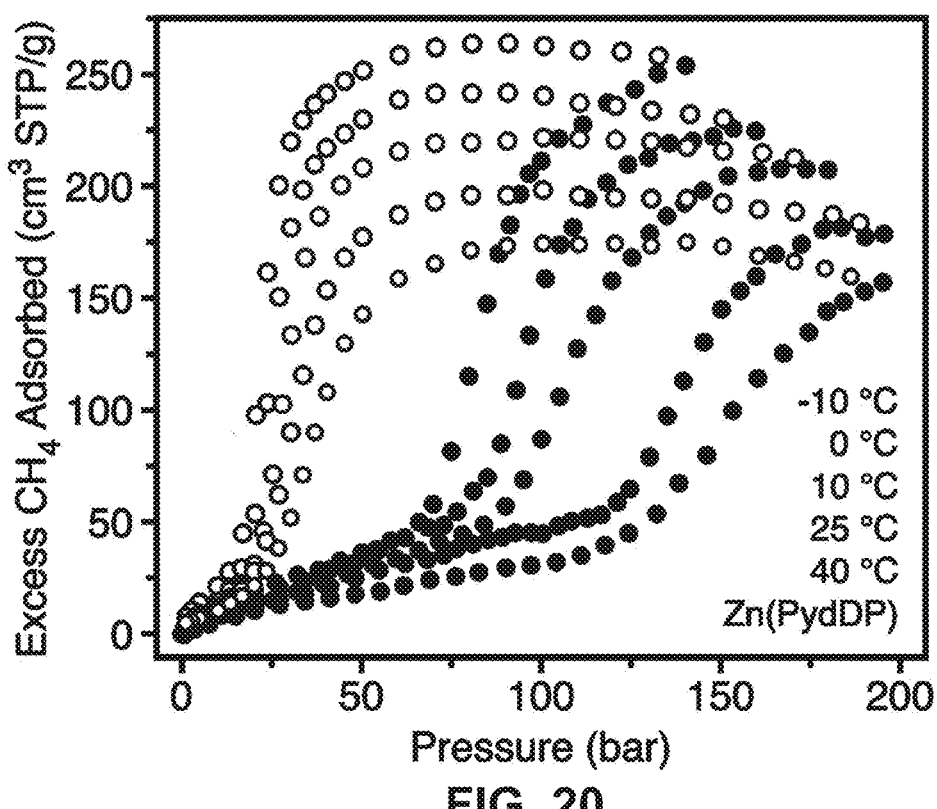
FIG. 20 is a plot of high-pressure $CH_4$ adsorption isotherms at variable temperatures (−10, 0, 10, 25, and 40° C.) for Zn(PydDP) with activation at 120° C. between runs.
Figure 21:
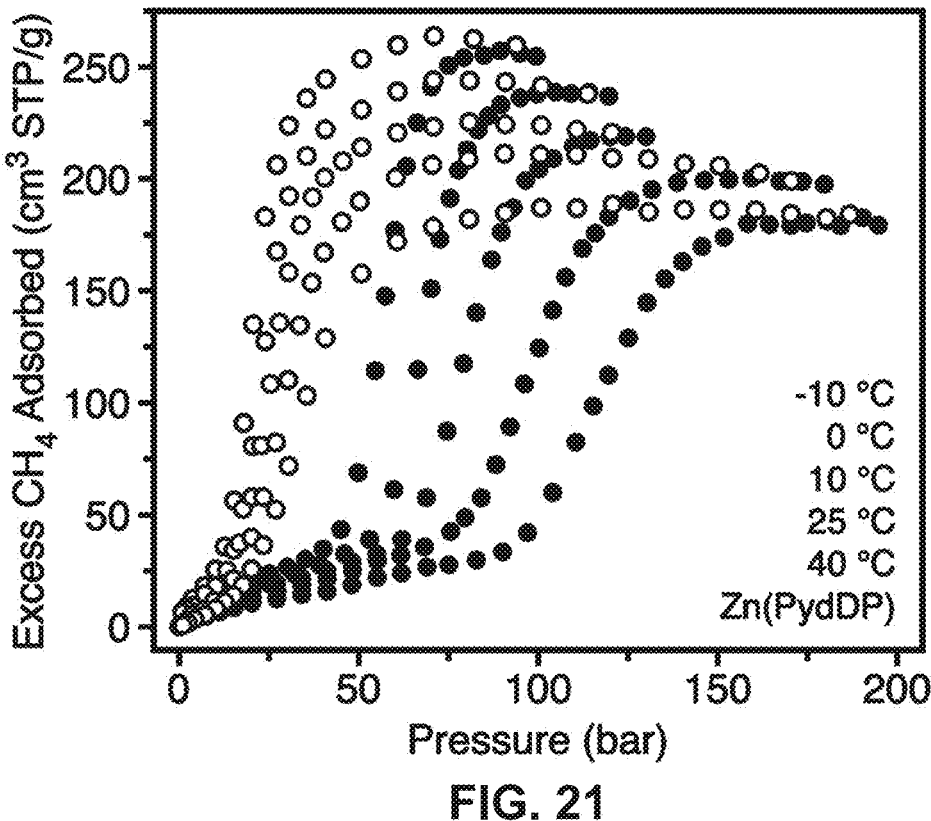
FIG. 21 is a plot of high-pressure $CH_4$ adsorption isotherms at variable temperatures (−10, 0, 10, 25, and 40° C.) for Zn(PydDP) with vacuum regeneration at room temperature between runs.

In comparison, Zn(PymDP), Zn(PyzDP), and Zn(PydDP) showed very little pre-step and step pressures from 25 bar up to 125 bar at 25° C. Plots of high-pressure $CH_4$ adsorption isotherms and $N_2$ adsorption isotherms at 25° C. and variable temperatures for Zn(PymDp) are shown in FIG. 16 and FIG. 17. Plots of high-pressure $CH_4$ adsorption isotherms and $N_2$ adsorption isotherms at 25° C. and variable temperatures for Zn(PyzDp) are shown in FIG. 18 and FIG. 19. Plots of high-pressure $CH_4$ adsorption isotherms at variable temperatures for Zn(PydDP) with activation at 120° C. between runs or with vacuum regeneration at room temperature between runs are shown in in FIG. 20 and FIG. 21.

The high pressure $N_2$ isotherms also revealed very little uptake up to 100 bar at 25° C., supporting the stabilization of the collapsed phase for these frameworks. Interestingly, Zn(PyzDP) showed step pressures higher than 100 bar at 25° C. and does not seem to reach saturation until almost 200 bar. This is the highest reported step pressures for methane at 25° C. for flexible materials. However, this framework is highly sensitive to pre-treatment conditions before adsorption measurements. By only utilizing vacuum after high pressure exposure, the step pressure for the phase change reduces from approximately 120 bar to 90 bar at 25° C. When activated at 120° C. between runs, the step pressure for Zn(PydDP) returns to about 120 bar showing that this behavior is reversible. Comparably, Zn(PyzDP) showed higher step pressures compared to Zn(PymDP), but Zn(PymDP) showed higher uptake below 100 bar at 25° C. These high-pressure isotherms further confirmed the hetero-cyclic stacking trend and the ability to tune the phase change expansion of these materials up to 125 bar for methane at ambient temperature.

Figure 22:
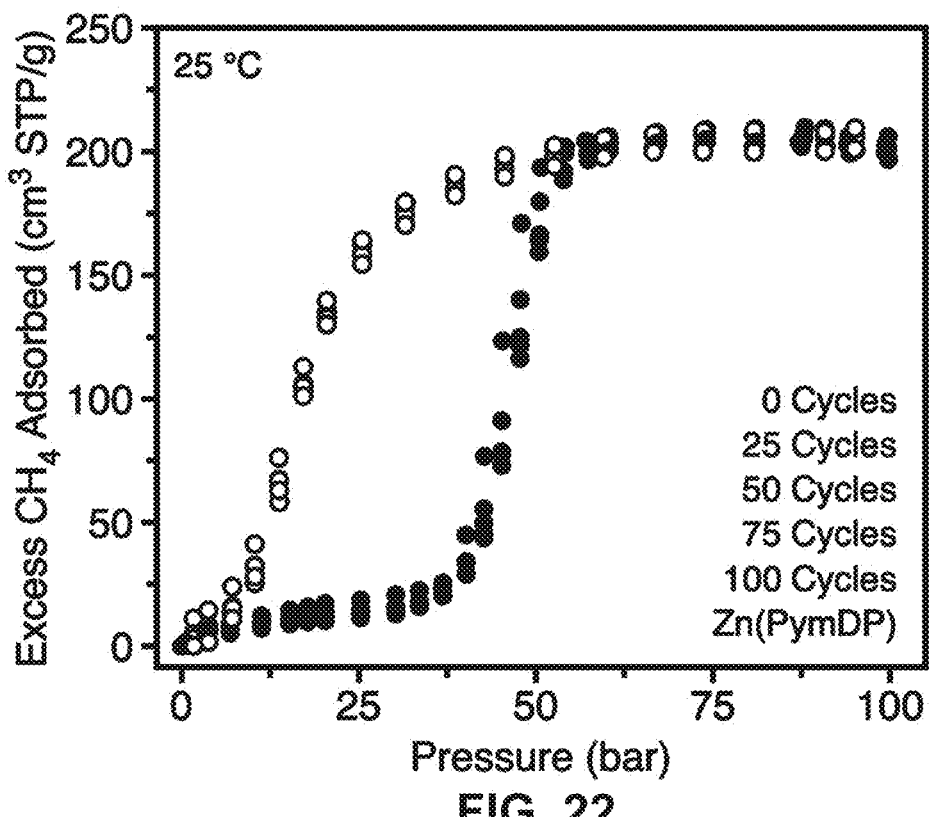
FIG. 22 is a plot of high-pressure $CH_4$ adsorption isotherms at 25° C. for Zn(PymDP) after 0, 25, 50, 75, and 100 cycles of 65-bar adsorption and 5-bar desorption.

Further stability and cycling studies were completed on Zn(PymDP) because it demonstrated good adsorption behavior at 25° C. for adsorbed natural gas (ANG) vehicle operation, which would need to expand completely by 65 bar and desorb at 5.8 bar. Thereafter, 100 cycles of adsorption and desorption were conducted on Zn(PymDP). FIG. 22 is a plot of high-pressure $CH_4$ adsorption isotherms at 25° C. for Zn(PymDP) after 0, 25, 50, 75, and 100 cycles of 65-bar adsorption and 5-bar desorption.

Figure 23:
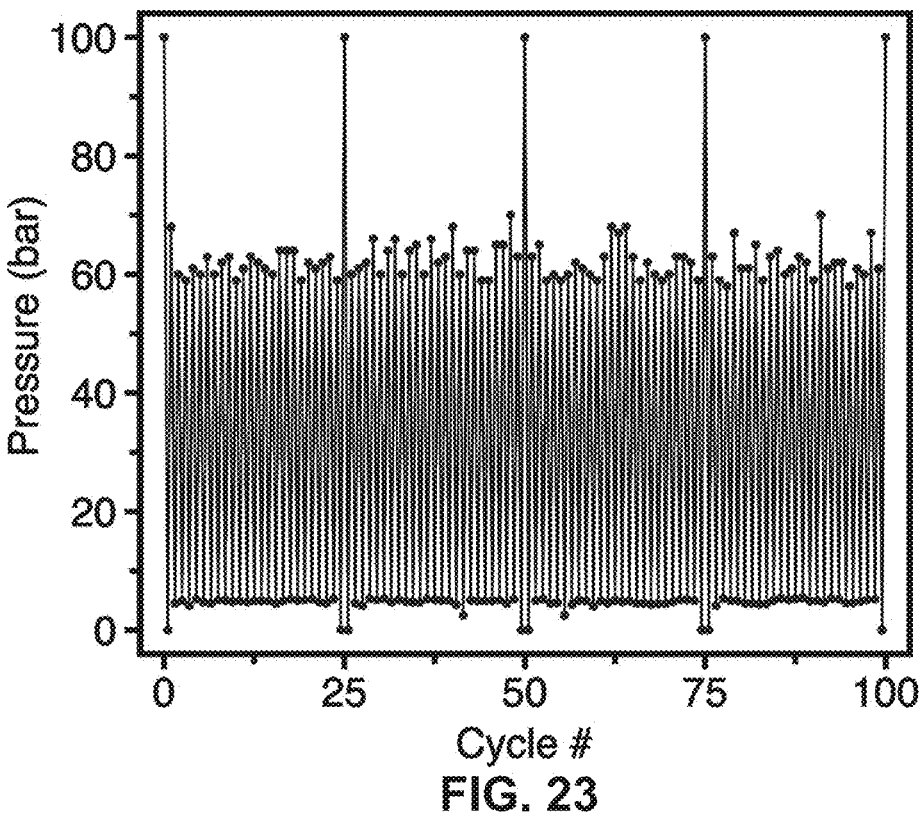
FIG. 23 is a plot of the adsorption and desorption pressures for each cycle shown as green and red circles, respectively, for 100 $CH_4$ adsorption-desorption cycles of Zn(PymDP) at 25° C.
Figure 24:
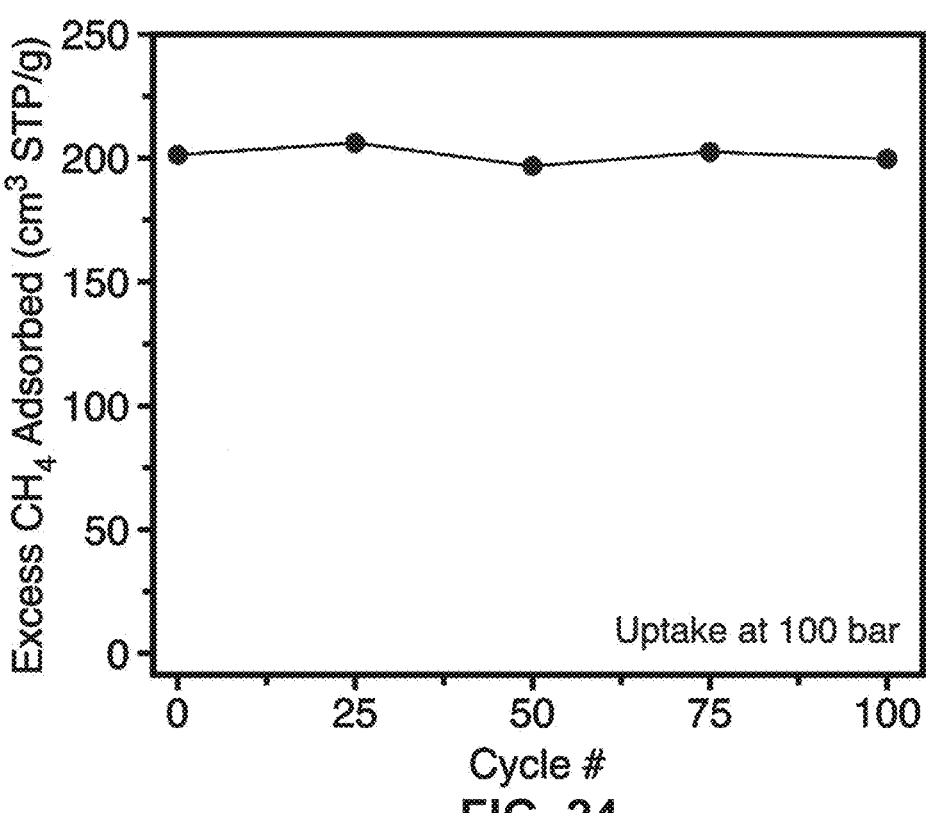
FIG. 24 is a plot of the excess $CH_4$ adsorbed uptake at 100 bar and 25° C. for Zn(PymDP) at cycles 0, 25, 50, and 100.
Figure 25:
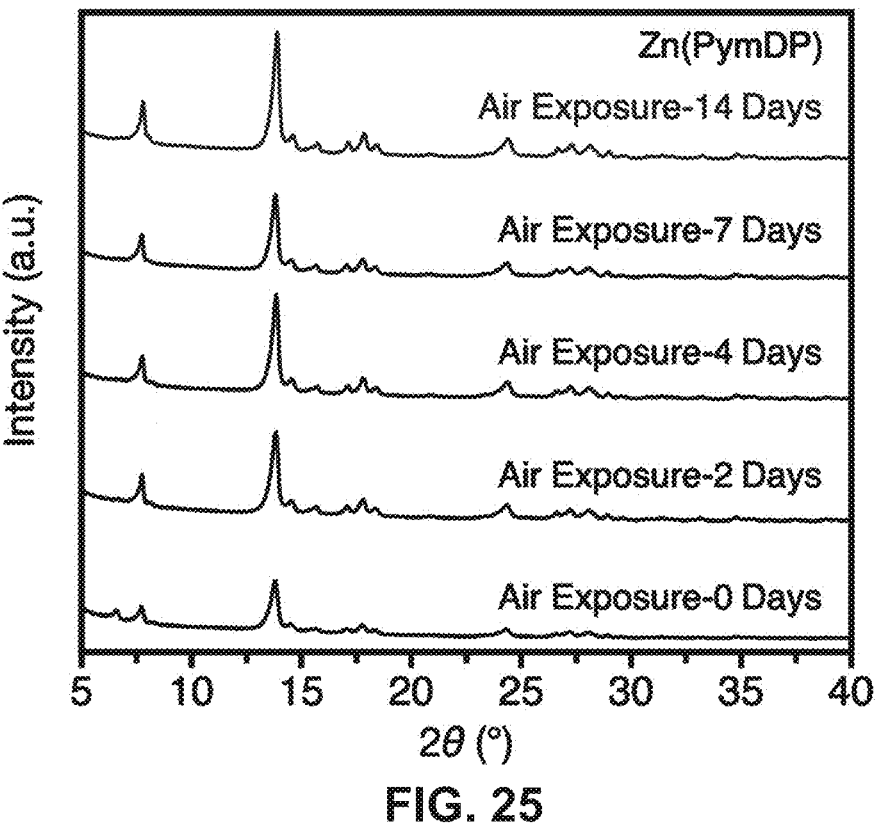
FIG. 25 is a schematic diagram of powder X-ray diffraction patterns of activated Zn(PymDP) at initial exposure, 2 days, 4 days, 7 days, and 14 days of air exposure at room temperature.

An initial isotherm of methane at 25° C. up to 100 bar was completed and then an adsorption isotherm was taken every 25 cycles as shown in FIG. 23. This showed the phase change to be highly reversible with no loss in uptake or usable capacity. A plot of the excess $CH_4$ adsorbed uptake at 100 bar and 25° C. for Zn(PymDP) at cycles 0, 25, 50, and 100 is shown in FIG. 24.

After confirming the high cyclability of the material, air exposure tests were conducted on the material. Powder X-ray diffraction patterns were taken of Zn(PymDP) after air exposure. A pristine sample was transferred in air to the sample holder and analyzed. Afterwards, the same sample was stored in a 20 ml scintillation vial and left open to air for 2, 4, 7, and 14 days. It can be observed that the structure and crystallinity of the MOF is mostly maintained with only slight changes in the lower angle peaks as shown in the X-ray diffraction patterns of FIG. 25.

Figure 26:
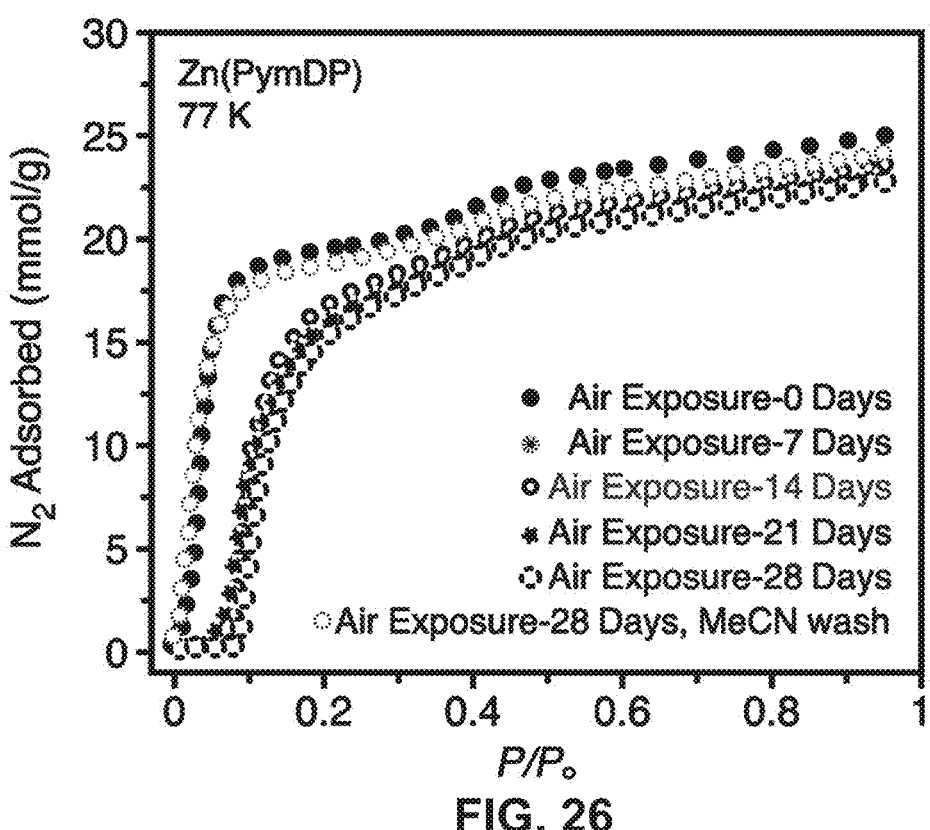
FIG. 26 is a plot of nitrogen adsorption isotherms at 77 K for activated Zn(PymDP) at 0, 7, 14, 21, and 28 day air exposure. The final isotherm was taken after 28-day air exposure and dispersed in acetonitrile and re-activated at 160° C. showing approximate reversible regeneration.

Nitrogen isotherms at 77 K were conducted to better understand if air exposure effects porosity and step pressure. It can be observed that the step pressure occurs at higher pressures with longer exposure to air with only a slight decrease in total uptake as seen in the plot of FIG. 26. Before each isotherm, the material is activated at 160° C. for 18 hours to remove anything from the pores. The material was then washed with acetonitrile, solvent decanted, and then reactivated at 160° C. This regenerated the step pressure position close to the pristine sample measurement. The material maintained high crystallinity and porosity after extended air exposure supporting this material to be highly stable and flexible.

Figure 27:
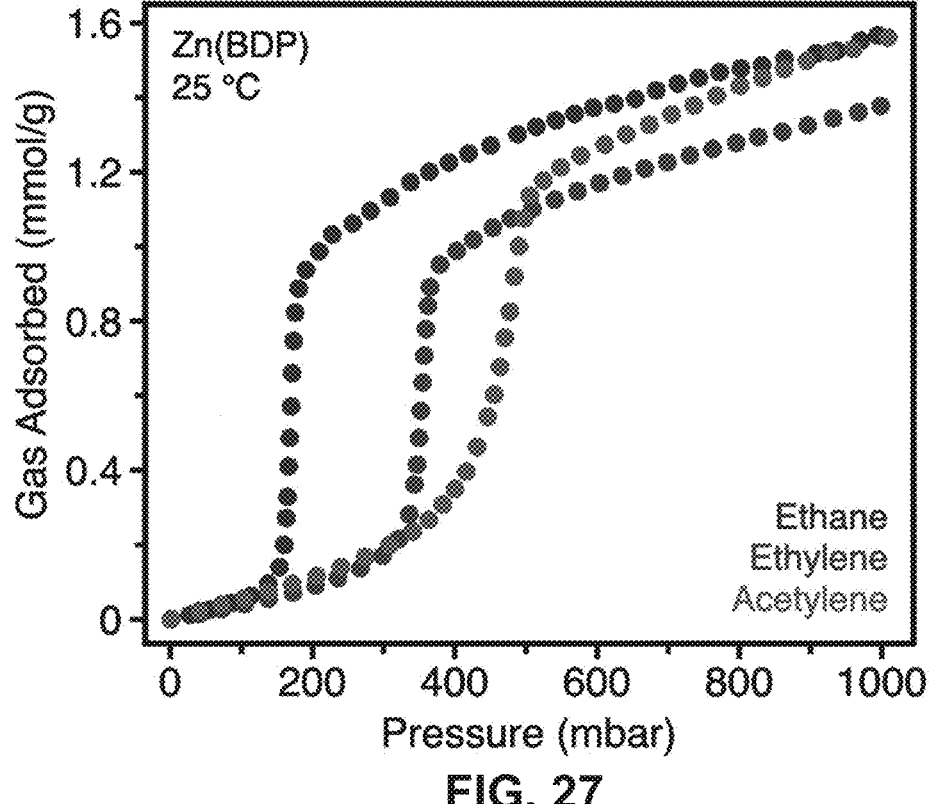
FIG. 27 is a plot of low-pressure adsorption isotherms of ethane, ethylene, and acetylene from left to right at 25° C. for Zn(BDP) showing reverse selectivity.

Since high tunability is possible in this phase transition, Zn(BDP) may be used in the separation of hydrocarbons as well as the other derivatives for different storage and separation applications as demonstrated in FIG. 27. Interestingly, it was observed that C2 hydrocarbons open the framework based on adsorbate size going from ethane to ethylene to acetylene. This preliminary data showed that these phase change materials have utility for separation as well as storage.

From the description herein, it will be appreciated that the present disclosure encompasses multiple implementations of the technology which include, but are not limited to, the following:

A composition comprising a metal organic framework M(BDP), where M is a metal selected from the group of Zn, Fe or Co; wherein the metal organic framework exhibits a reversible phase change from a collapsed state to an expanded state with a change in environmental pressure.

A composition comprising a metal organic framework M(PyDP), where M is a metal selected from the group of Zn, Fe or Co; wherein the metal organic framework exhibits a reversible phase change from a collapsed state to an expanded state with a change in environmental pressure.

A composition comprising a metal organic framework M(PymDP), where M is a metal selected from the group of Zn, Fe or Co; wherein the metal organic framework exhibits a reversible phase change from a collapsed state to an expanded state with a change in environmental pressure.

A composition comprising a metal organic framework M(PyzDP), where M is a metal selected from the group of Zn, Fe or Co; wherein the metal organic framework exhibits a reversible phase change from a collapsed state to an expanded state with a change in environmental pressure.

A composition comprising a metal organic framework M(PydDP), where M is a metal selected from the group of Zn, Fe or Co; wherein the metal organic framework exhibits a reversible phase change from a collapsed state to an expanded state with a change in environmental pressure.

A metal organic framework, comprising: (a) a first ligand selected from the group of ligands consisting of 2,5-pyridinedipyrazolate ($H_2PyDP$), 2,5-pyrimidinedipyrazolate ($H_2PymDP$), 2,5-pyrazinedipyrazolate ($H_2PyzDP$), and 3,6-pyridazinedipyrazolate ($H_2PydDP$); (b) a second ligand selected from the group of ligands consisting of 2,5-pyridinedipyrazolate ($H_2PyDP$), 2,5-pyrimidinedipyrazolate ($H_2PymDP$), 2,5-pyrazinedipyrazolate ($H_2PyzDP$), and 3,6-pyridazinedipyrazolate ($H_2PydDP$); and (c) at least one metal; (d) wherein the metal organic framework exhibits a reversible phase change from a collapsed state to an expanded state with a change in environmental pressure.

The metal organic framework of any previous or following implementation, wherein the metal is a metal selected from the group consisting of Zn, Fe and Co.

The metal organic framework of any previous or following implementation, wherein the first ligand and the second ligand are the same.

A method for reversible gas storage, the method comprising: (a) providing a metal organic framework M(LDP), where M is a metal selected from the group of Zn, Fe or Co and L is a ligand selected from the group of 1,4-benzenedipyrazolate ($H_2BDP$), 2,5-pyridinedipyrazolate ($H_2PyDP$), 2,5-pyrimidinedipyrazolate ($H_2PymDP$), 2,5-pyrazinedipyrazolate ($H_2PyzDP$), and 3,6-pyridazinedipyrazolate ($H_2PydDP$); and (b) adsorbing a gas to the metal organic framework; (c) wherein the metal organic framework exhibits a reversible phase change from a collapsed state to an expanded state with a change in environmental pressure; and (d) wherein the adsorbed gas is desorbed when the metal organic framework is in a collapsed state.

The method of any previous or following implementation, wherein the metal organic framework comprises: (a) a first ligand selected from the group of ligands consisting of 1,4-benzenedipyrazolate ($H_2BDP$), 2,5-pyridinedipyrazolate ($H_2PyDP$), 2,5-pyrimidinedipyrazolate ($H_2PymDP$), 2,5-pyrazinedipyrazolate ($H_2PyzDP$), and 3,6-pyridazinedipyrazolate ($H_2PydDP$); (b) a second ligand selected from the group of ligands consisting of 1,4-benzenedipyrazolate ($H_2BDP$), 2,5-pyridinedipyrazolate ($H_2PyDP$), 2,5-pyrimidinedipyrazolate ($H_2PymDP$), 2,5-pyrazinedipyrazolate ($H_2PyzDP$), and 3,6-pyridazinedipyrazolate ($H_2PydDP$); and (c) at least one metal.

The method of any previous or following implementation, wherein the first ligand and the second ligand of the MOF are the same.

The method of any previous or following implementation, further comprising evaluating an adsorption isotherm for each MOF configuration; identifying an optimum pressure of gas using the adsorption isotherm of each MOF; and exposing the provided metal organic framework to a gas at an identified optimum pressure.

A method for gas separations, the method comprising: (a) providing a bed of one or more metal organic frameworks selected from the group M(LDP), where M is a metal and L is at least one ligand selected from the group of 1,4-benzenedipyrazolate (H$_2$BDP), 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP); (b) exposing the bed of metal organic frameworks to a flow of gases to be separated; and (c) releasing adsorbed gases from the metal organic frameworks after a period of time; (d) wherein the metal organic framework exhibits a reversible phase change from a collapsed state to an expanded state with a change in environmental pressure; and (e) wherein the adsorbed gas is desorbed when the metal organic framework is in a collapsed state.

A method for gas separations, the method comprising: (a) providing a bed of one or more metal organic frameworks selected from the group of Zn(BDP), Zn(PyDP), Zn(PymDP), Zn(PyzDP), and Zn(PydDP); (b) exposing the bed of metal organic frameworks to a flow of gases to be separated; and (c) releasing adsorbed gases from the metal organic frameworks after a period of time.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including", "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to 5°, less than or equal to 4°, less than or equal to 3°, less than or equal to 2°, less than or equal to 1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A composition comprising:
   a metal organic framework M(LDP), where M is a metal and L is at least one ligand selected from the group of 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP);
   wherein said metal organic framework exhibits a reversible phase change from a collapsed state to an expanded state with a change in environmental pressure.

2. The metal organic framework of claim 1, wherein said metal is a metal selected from the group consisting of Zn, Fe and Co.

3. The metal organic framework of claim 2, said framework comprising Zn(PyDP).

4. The metal organic framework of claim 2, said framework comprising Zn(PymDP).

5. The metal organic framework of claim 2, said framework comprising Zn(PyzDP).

6. The metal organic framework of claim 2, said framework comprising Zn(PydDP).

7. The metal organic framework of claim 1, wherein said ligand further comprises:
   at least one first ligand selected from the group of ligands consisting of 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP); and
   at least one second ligand selected from the group of ligands consisting of 1,4-benzenedipyrazolate (H$_2$BDP), 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP).

8. The method of claim 7, wherein said first ligand and said second ligand of said metal organic framework are the same.

9. A method for reversible gas storage, the method comprising:
   (a) providing a metal organic framework M(LDP), where M is a metal selected from the group of Zn, Fe or Co and L is at least one ligand selected from the group of 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP); and
   (b) adsorbing a gas to said metal organic framework;
   (c) wherein said metal organic framework exhibits a reversible phase change from a collapsed state to an expanded state with a change in environmental pressure; and
   (d) wherein said adsorbed gas is desorbed when the metal organic framework is in a collapsed state.

10. The method of claim 9, wherein the metal organic framework comprises Zn(PyDP), Zn(PymDP), Zn(PyzDP), or Zn(PydDP).

11. The method of claim 9, wherein the metal organic framework comprises a bed of Zn(BDP) and one or more of Zn(PyDP), Zn(PymDP), Zn(PyzDP), and Zn(PydDP) frameworks.

12. The method of claim 9, wherein the metal organic framework comprises:
   a first ligand selected from the group of ligands consisting of 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP); and
   at least one second ligand selected from the group of ligands consisting of 1,4-benzenedipyrazolate (H$_2$BDP), 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP).

13. The method of claim 9, further comprising:
   evaluating an adsorption isotherm for each metal organic framework configuration;
   identifying an optimum pressure of gas using the adsorption isotherm of each metal organic framework; and
   exposing the provided metal organic framework to a gas at an identified optimum pressure.

14. A method for gas separations, the method comprising:
   (a) providing a bed of one or more metal organic frameworks selected from the group M(LDP), where M is a metal and L is at least one ligand selected from the group of 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP);
   (b) exposing the bed of metal organic frameworks to a flow of gases to be separated; and
   (c) releasing adsorbed gases from the metal organic frameworks after a period of time;
   (d) wherein said metal organic framework exhibits a reversible phase change from a collapsed state to an expanded state with a change in environmental pressure; and

(e) wherein said adsorbed gas is desorbed when the metal organic framework is in a collapsed state.

15. The method of claim 14, wherein said metal of said metal organic framework is a metal selected from the group consisting of Zn, Fe and Co.

16. The method of claim 14, wherein said metal organic framework is at least one framework selected from the group consisting of Zn(PyDP), Zn(PymDP), Zn(PyzDP), and Zn(PydDP).

17. The method of claim 14, wherein the metal organic framework comprises a bed of Zn(BDP) and one or more of Zn(PyDP), Zn(PymDP), Zn(PyzDP), and Zn(PydDP) frameworks.

18. The method of claim 14 wherein said ligand of said metal organic framework comprises:

at least one first ligand selected from the group of ligands consisting of 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP); and at least one second ligand selected from the group of ligands consisting of 1,4-benzenedipyrazolate (H$_2$BDP), 2,5-pyridinedipyrazolate (H$_2$PyDP), 2,5-pyrimidinedipyrazolate (H$_2$PymDP), 2,5-pyrazinedipyrazolate (H$_2$PyzDP), and 3,6-pyridazinedipyrazolate (H$_2$PydDP).

19. The method of claim 14, further comprising:

evaluating an adsorption isotherm for each metal organic framework configuration;

identifying an optimum pressure of gas using the adsorption isotherm of each metal organic framework; and exposing the provided metal organic framework to a gas at an identified optimum pressure.

* * * * *